Oct. 1, 1940.   O. STEINER   2,216,463
CINEMATOGRAPH CAMERA PROVIDED WITH A MAGAZINE
Filed Feb. 27, 1937   2 Sheets-Sheet 1
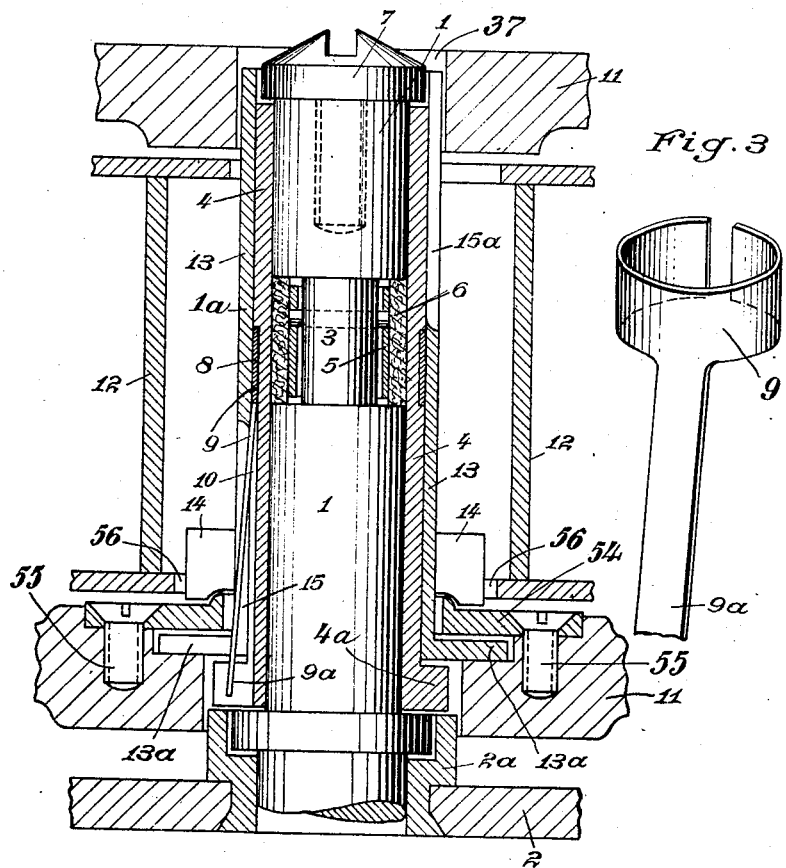
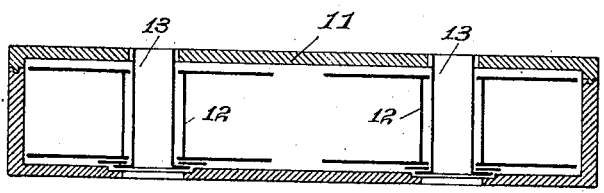

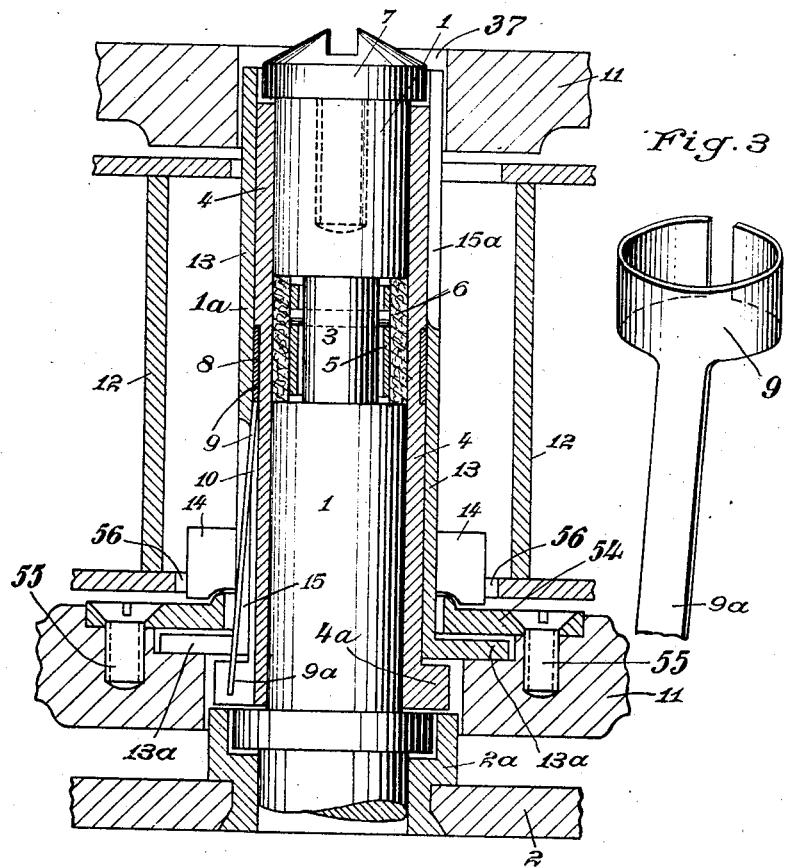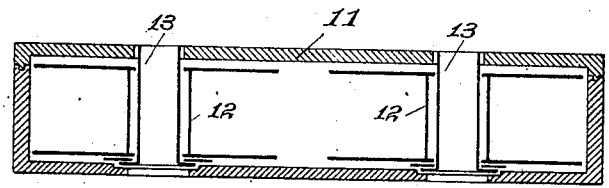

Patented Oct. 1, 1940

2,216,463

UNITED STATES PATENT OFFICE 2,216,463.

CINEMATOGRAPH CAMERA PROVIDED WITH A MAGAZINE

Otto Steiner, Berlin-Spandau, Germany, assignor, by mesne assignments, to Siemens & Halske, Aktiengesellschaft, Berlin, Germany, a corporation of Germany Application February 27, 1937, Serial No. 128,216
In Germany February 29, 1936

7 Claims. (Cl. 242—55)

My invention relates to a cinematograph camera provided with a magazine.

The object of my invention is to provide a cinematograph camera, particularly a camera having a magazine arranged therein, in which the film is carried by spools which together with the spool shafts are so designed that they may be placed on the latter only in a given position. If, for instance, one of the spool flanges is provided at the inner periphery thereof with an even number of grooves, whereas the other spool flange with an odd number, and if one of the shafts is provided with an even number of projections adapted to the grooves of one of the flanges, whereas the other shaft is provided with an odd number of projections, the spool can be placed on each of the spool shafts only if the proper spool flange is placed on the shaft. If such spools are employed in a magazine for the purpose of inserting both spools together in the camera, difficulties are presented if the devices which ensure the proper position of the spool are firmly secured to the camera. These difficulties are due to the fact that the magazine can be inserted into the camera only if both spools are brought into the proper angular position with respect to the corresponding spool shafts. A determination of the proper position of the spools with respect to the shafts by way of trial is not possible owing to the arrangement of the spools in a closed magazine.

According to the invention, the devices for ensuring the proper position of the spools are not secured to the camera itself, but are provided in the removable magazine and associated therewith. The spools, when inserting the magazine into the camera, are separately brought into engagement with the film guiding devices of the camera. In this way no difficulties are encountered in inserting the magazine with both spools. When inserting the magazine, the spool shaft is only coupled with an intermediate member provided in the magazine, whereas the spool itself is not moved in the magazine. If the magazine itself can only be inserted in a given position, also a corresponding position of the spools with respect to the camera is thereby ensured.

According to the invention, further, the intermediate members of the magazine which ensure the proper position of the spools have a bore of at least the same diameter as the spools. To this end, the intermediate members may be circular in form and may have axially extending lugs for engaging a spool set upon said member. Between these lugs one or more grooves are preferably provided in the bore of this circular member with which a coupling means arranged on the spool shaft may be brought into engagement.

Further details of my invention will be apparent from the following description taken in connection with the accompanying drawings in which—

Fig. 1 shows a sectional view of a take-up shaft, for instance, of a camera and of the magazine containing the reel and placed in the camera.

Fig. 2 shows a sectional view of the magazine with both reels for the film to be employed.

Fig. 3 illustrates a spring for establishing a coupling between the reel shaft and a driving member.

Fig. 4 shows a sectional view of a modified form of the take-up shaft and of the reel placed thereon and arranged inside the magazine.

Fig. 4a shows a constructional detail of Fig. 4.

Fig. 5 illustrates schematically a complete camera and a magazine to be inserted therein.

Referring at first to Fig. 5, 50 denotes the body of a cinematograph camera, the objective of which is designated by 51. The camera has a chamber for a film magazine; 2 indicates the bottom plate of this magazine chamber. A cover is hinged to the camera body. The camera contains a mechanism for transporting the film. The active members of this mechanism consist of shafts or sleeves 4, the structure and arrangement of which will be described later.

The magazine 11 has openings 37 arranged coaxially with respect to the two film spools. The two openings 37 fit over the sleeves 4 of the camera. 53 designates the film and especially that part of the film passing an exposure opening of the magazine. When the magazine is inserted into the camera, the film portion 53 lies in the optical axis of the lens 51 and is held, by common film guiding means, in the proper position.

In Fig. 1, the parts 2, 11 and 4 coincide with the correspondingly designated parts illustrated in Fig. 5. 1 denotes the take-up shaft of the camera. This shaft forms part of the camera mechanism.

Shaft 1 passes through a bushing 2a arranged in the plate 2, the bushing serving also as a guide for the magazine 11. The shaft 1 is provided with a groove 3 for the reception of a friction coupling which causes the rotation of the sleeve 4 placed on the shaft 1. The friction coupling consists, for instance, of a resilient ring 5 placed in the groove 3 and a felt packing 6. A pin 1a traversing shaft 1 passes through two bores of ring 5 and couples shaft and ring. The sleeve 4 arranged on the take-up shaft 1 is held in position by a screw 7 and may be rotated with respect to the shaft 1 by overcoming the friction coupling.

The sleeve 4 is also provided with a circular groove 8 in which a spring 9 is arranged having, for instance, the shape as shown in Fig. 3. The spring 9 tends to move its lower part 9a away from the axis. Part 9 may come into engagement with a longitudinal groove 10 provided in the sleeve 4.

A magazine 11 containing the spool 12 is placed over shaft 1 and sleeve 4. The magazine 11 contains for each spool a bush 13 having a flange 13a rotatably mounted in the magazine by means of a plate 54 secured to magazine 11 by screws 55. The brush 13 is provided with wings 14 which engage in corresponding apertures 56 arranged in the flange of spool 12 and hold the latter in the proper position. The wings 14 are provided with a groove in the neighborhood of plate 54 in order to prevent the lower edge of the spool from sliding under the wings.

The bush 13 is further provided with a slot 15 with which the spring 9 comes into engagement when both parts assume a suitable position with respect to each other. When the magazine 11 with the bush 13 secured therein is placed on the sleeve 4, the slot 15 of the bush 13 will, in general, not be in registry with the position of the spring 9 in the groove 10. The bush, therefore, forces the spring back into the groove 10 and may be moved without hindrance on the sleeve 4 up to a collar 4a thereof.

When now shaft 1 and sleeve 4 are rotated relatively to bush 13, the recesses 10 and 15 come into registry and the spring 9 engages the recess 15 of bush 13 thus establishing a coupling and, hereby, a rotation of bush 13 as well as of the spool 12 which cooperates with the wings 14. To prevent a distortion of the spring 9, the lower end 9a engages in a corresponding recess arranged in collar 4a of sleeve 4.

The bush 13 arranged in the magazine 11 is further provided with a slot 15a. This other slot cooperates with spring 9, if, for instance, the magazine contains a film which is to be exposed in two positions so that the magazine with the spools contained therein must be inserted in the camera in two positions and, to this end, is to be turned at 180° about an axis perpendicular to the axes of the spools, or if the film is to be wound back on the other spool, for instance, for the production of dissolves or fadeovers.

The friction coupling between the take-up core 1 and the sleeve 4 ensures the driving of the reel 12 under a constant tension. This is necessary because the shaft 1 revolves with a constant speed of rotation, whereas the rotation speed of the reel 12 varies, depending upon the amount of the film strip wound thereon. The difference in rotation speed is made possible by the slip within the resilient friction coupling. A corresponding fric... 1 coupling may also be provided for the film supply spool in order to maintain the film slightly stretched. This coupling is preferably arranged inside the sleeve 4 in order to ensure a proper guide of the spool in the magazine by the shaft 1 arranged in the camera.

In Fig. 2 is shown schematically the manner in which the spools 12 are placed on the bushes 13 and mounted within the magazine 11 so long as the magazine is not inserted in the cinematograph camera. With the magazine inserted in the camera the spools 12 and the bushes 13 are no longer guided by the magazine but by the sleeve 4.

In Fig. 4, showing a modification, 1 again denotes the take-up shaft driven by the mechanism of the camera, 2 the bottom plate of the magazine chamber and 22a is a bushing for the shaft 1 arranged in the plate 2. Concentrically to the shaft 1 is arranged a bush 24 which is provided with a bore adapted at its upper end to the diameter of the shaft 1 and is held in position with respect to the shaft 1 by a spacing ring 24a. Consequently, inside the bush 24 there is a hollow space available for the reception of a resilient ring 25 in the form of a slotted tube and of a felt packing 26. A pin 1a extending through the shaft 1 passes through holes provided in the resilient ring 25 so as to cause the latter to rotate together with the shaft 1. The arrangement just described represents a friction coupling between the shaft 1 and the bush 24 which is capable of being driven by a predetermined force. The parts of the friction coupling slide against each other with increasing diameter of the film spool as already mentioned with respect to the corresponding coupling of Fig. 1.

A sliding off of the bush 24 from the shaft 1 is prevented by the screw 7. The head of the screw has a conical shape in order to facilitate the inserting of the magazine, the two side walls of which are indicated by 11a and 11b.

The bush 24 is provided in its central portion with a flat circular groove 24b in which is placed a portion of a coupling spring 28 bent into a ring. This spring similar to that shown in Fig. 3 has also an extension which tends to move away from shaft 21 but can be forced back into a longitudinal slot 30 of the bush 24 when a film spool 12 is inserted. The lower end of this resilient extension engages in a collar 24c of the bush 24. The longitudinal slot 30 extends also through this collar 24c.

The bottom wall 11a of the magazine is provided with rings 33 and 34. Between these rings extends a flange 35b of another loosely mounted ring 35. This ring is shown more in detail in Fig. 4a. The ring 35 is provided with a plurality of lugs or teeth 36 extending in parallel relation to the axis of rotation of the ring, the arrangement of the lugs corresponding to grooves provided in the hole of the spool 32. If a spool is to be inserted into the magazine, the spool flange whose grooves correspond to the teeth 36 must be brought into engagement with the teeth.

Between the lugs 36, the ring 35 may present one or more grooves 35a in which the extension of the spring 28 may engage.

With the type of magazine and of the take-up shaft shown in Fig. 4 it is also easily possible to insert the magazine in the camera in a reverse position so that the other magazine wall 11b faces the camera plate 2. This other position may serve to wind back the film on the film supply reel—for instance for the purpose of producing dissolves or fade-overs. The possibility of inserting the film spool in two reversed positions can also be utilized for providing the film with two parallel rows of pictures. At first, one row is exposed which covers lengthwise one-half of the film. Then the spool is reversed in the above-described manner and the second row of pictures is produced. In each of these reverse positions, the magazine is centered with respect to the take-up shaft by a plate-shaped edge of the bush 22a which in one position of the magazine just fills up the hole of the ring 33, whereas in the second position it fills up the hole 37 of the magazine cover 11b. After inversion of the magazine, the extension of the spring 28 comes into engagement with a groove of the flange of the second film spool extending towards the magazine cover.

The second spool shaft of the camera may be designed in a similar manner as the take-up shaft. This second shaft guides the film supply spool which is also loosely mounted in the magazine. If, according to the drawings, a friction is imparted to this other shaft, the advantage is obtained that a resistance of constant value opposes the unwinding of the film so that the film uniformly passes through the camera without being loosened.

It will be understood that various modifications and changes may be made without departing from the spirit and scope of my invention.

I claim:

1. In combination with a cinematograph camera having a removable magazine for detachable film spools, said camera having actuating shafts, coupling means provided on at least one of said shafts, and a frictional connection between said coupling means and said shaft, said magazine having one revolvable intermediate member disposed for each spool to be actuated, said member being associated with said magazine and designed for centering said spool, means provided on said member for coupling said member with said spool, and means also provided on said member for engaging said coupling means of said shaft.

2. In combination with a cinematograph camera having a removable magazine for detachable film spools, said camera having actuating shafts, a sleeve disposed on at least one of said shafts, said sleeve and said shaft carrying said sleeve forming an interstice between each other, an elastic element and a frictional lining arranged in said interstice, said elastic element being disposed so as to exert a force upon said lining in order to establish a frictional driving connection between said shaft and said sleeve, and resilient coupling means mounted to said sleeve, said magazine having a revolvable intermediate member provided with a central boring and being disposed so as to fit said sleeve of said camera, said intermediate member being designed to engage said resilient coupling means of said sleeve in a given position and having coupling elements for securing a spool set axially upon said intermediate member in a given position.

3. In combination with a cinematograph camera having a removable magazine for detachable film spools, said camera having an actuating shaft and a resilient coupling element mounted to said shaft so as to radially protrude from said shaft, said magazine having a revolvable ring associated with said magazine so as to pass over said shaft when inserting said magazine into said camera, said revolvable ring having a radial groove at its inner periphery disposed to engage said resilient coupling element of said shaft and being designed for securing a spool set axially on said ring in a fixed position with respect to said ring.

4. In combination with a cinematograph camera having a removable magazine for detachable film spools, said camera having an actuating shaft and a plate spring secured to said shaft so as to resiliently protrude from said shaft in radial direction, said magazine having a revolvable member associated therewith and provided with a central boring fitting over said shaft, said revolvable member having a radial groove disposed to engage said plate spring and coupling means for securing a spool set coaxially upon said revolvable member in a given position.

5. In a film spool magazine as set forth in claim 3, said revolvable ring having a flange-shaped edge and axially protruding lugs for engaging the spool to be coupled, said flange being disposed at one of the walls of said magazine, and means mounted to said magazine wall and covering said flange so as to secure said revolvable ring to said wall.

6. In a camera as set forth in claim 4, a sleeve disposed upon said actuating shaft, a friction coupling arranged between said shaft and said sleeve, said sleeve having at its outside a circumferential and a longitudinal groove communicating with each other, said aforementioned plate spring consisting of a ring-shaped portion and a plate-shaped extension and being mounted to said sleeve so as to have its ring-shaped portion in said circumferential groove and its extension in said longitudinal groove, said extension being designed to resiliently protrude from said longitudinal groove in radial direction in order to establish a coupling with the revolvable member of the camera.

7. In combination with a cinematograph camera having a removable magazine for detachable film spools, said camera having shafts for actuating the spools of a magazine and a resilient coupling element mounted on at least one of said shafts so as to radially protrude from said shaft, said magazine having a revolvable sleeve for each of said film spools, said sleeves being journaled between the two opposite side walls of said magazine, at least one of said sleeves having a longitudinal slot for engaging said resilient coupling element of said camera, radially protruding lugs provided on said sleeve for coupling a spool set upon said sleeve in a given position, and means mounted to said magazine for securing said sleeve to said magazine.

OTTO STEINER.